United States Patent [19]
Yamamoto

[11] Patent Number: 5,122,913
[45] Date of Patent: Jun. 16, 1992

[54] DATA RECORDING/REPRODUCING APPARATUS WITH ERROR DETECTION AND DATA RE-RECORDING

[75] Inventor: Hirotoshi Yamamoto, Higashi-hiroshima, Japan

[73] Assignee: Sharp Kabushiki Kaisha, Osaka, Japan

[21] Appl. No.: 457,186

[22] Filed: Dec. 26, 1989

[30] Foreign Application Priority Data

Dec. 29, 1988 [JP] Japan .................................. 63-334227
Dec. 29, 1988 [JP] Japan .................................. 63-334228

[51] Int. Cl.$^5$ .............................................. G11B 5/09
[52] U.S. Cl. ........................................................ 360/53
[58] Field of Search ..................... 360/53; 371/39, 40, 371/44, 45

[56] References Cited

U.S. PATENT DOCUMENTS 4,637,023 1/1987 Lounsbury et al.
4,796,110 1/1989 Glass et al. .......................... 360/53

FOREIGN PATENT DOCUMENTS 60-000673 5/1985 Japan.
61-000972 5/1986 Japan.

OTHER PUBLICATIONS

Article from Mini-Micro Systems (Oct. 1982); "Streaming-tape Parameters Determine Formatter Characteristics"; Jerry Tileston pp. 257-264.

Primary Examiner—Vincent P. Canney

[57] ABSTRACT

Generally in the case that a rotary head type digital audio tape recorder is used as an auxiliary storage of a computer or the like, the R-DAT reads recorded data immediately after the data is recorded and inspects its recording state by comparing it with the original recorded data, and if the recording state is inferior, namely, if an error is detected, the R-DAT records the data again in order to improve reliability of the recorded data. Since an R-DAT according to the present invention re-records the original data of the error-detected data plural times, the R-DAT allows for reproduction of the data re-recorded immediately after, or further thereafter the error-detected data, in the case that the first re-recorded data cannot be reproduced correctly. Moreover, since the R-DAT re-records the data in which an error was detected and the data recorded immediately before the error data, the R-DAT can reproduce the re-recorded data in the case that the data contiguous to a defective portion of a recording medium cannot be correctly reproduced due to expansion of the defective portion caused by repetition of reproducing operations, or other reasons. In this way, reliability of recorded data is remarkably improved.

16 Claims, 5 Drawing Sheets

DATA RECORDING/REPRODUCING APPARATUS WITH ERROR DETECTION AND DATA RE-RECORDING

BACKGROUND OF THE INVENTION

1. Field of the Invention

The present invention relates to a data recording/reproducing apparatus such as a rotary head type digital audio tape recorder (hereinafter referred to as R-DAT) and the like which can perform recording/reproducing of digital signals.

2. Description of the Background Art

In some examples of the background art, there has been considered a magnetic recording/reproducing apparatus such as an R-DAT or the like which makes it possible to reproduce original data from partially lost data using an error correction technique during reproduction, by adding some error correction information (such as parity check code) to the original data, in the case of recording digital signals in high density on a magnetic recording medium. Although such an apparatus can completely correct data which has a very small lost part, it cannot reproduce original data in a case wherein a consecutive write error has caused data to be lost in a wide range, for example, in the case wherein a so-called flaw exists over a wide range on a magnetic tape.

In the case of using such a magnetic recording/reproducing apparatus as an auxiliary storage of a computer or the like, it is necessary to check recorded data after writing them, in order to detect such a situation as this. To check those data, for example, there is a method for verification wherein after finishing a write operation the magnetic tape is rewound to a position at which the recording was started and then run at the same speed as a speed during recording to reproduce the data to make a parity check. Such a method as this requires a long time for recording data due to the necessity of writing data again, in the case that some errors occur in the reproduced data due to a flaw on the recording medium and the errors cannot be corrected.

There is also a magnetic recording/reproducing apparatus which has improved its reliability of recording by means of a method in which the apparatus is provided with a separate writing head and a separate reading head, reproduces the data written on a magnetic recording medium with the reading head immediately after writing the data with the writing head, and compares them with the original data. Such a magnetic recording/reproducing apparatus as this improves reliability of recording by checking the recorded data to detect write errors through the comparison method or the like and writing the data again, if necessary.

Figure 1:
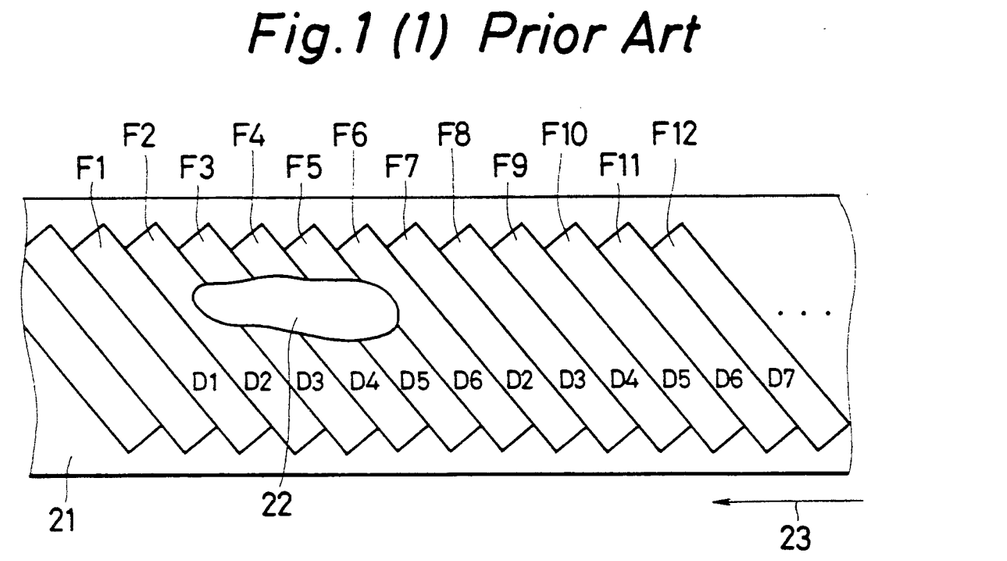

FIG. 1 is a diagram showing a recording pattern of a magnetic tape on which data was recorded by the above-mentioned magnetic recording/reproducing apparatus. The magnetic tape 21 is run in the direction of arrow 23 and data Di (i=1,2,...) is recorded in a frame Fi (i=1,2,...) sequentially. In this case, when an error occurs in data D2 in frame F2 due to a defective portion or a flaw on the magnetic tape 21 as shown in FIG. 1 (1), the data D2 is re-recorded. Since the magnetic recording/reproducing apparatus has already performed recording up to data D6 in a frame F6 before the error of the data D2 is detected, data of an after the data D2 are recorded on and after a frame F7.

Since a tracking control for reproducing data from the magnetic tape 21 is performed on the basis of reproduced signals, some disorder occurs in the tracking control when reproducing frames F2 to F6 which have a defective portion 22 thereon. Since it takes a certain period of time for the tracking control to recover from this disorder, data in the frames to be reproduced for this period of time may not be reproduced correctly. Namely, the data D2 in the frame F7 and the like which were re-recorded on the magnetic tape 21 may not be reproduced correctly.

As shown in FIG. 1 (2), the defective portion 22 may be slightly overlapped on the frame F1. In this case, since a defective portion of the frame F1 occupies only a minute area, an error found in the error detection immediately after recording can be corrected.

In the case of reproducing data from the magnetic tape 21 multiple times, wear or the like of the surface of the recording medium may cause its recording state to be deteriorated or the defective portion in the frame F1 to be expanded, and this may make it impossible to correct an error in the data D1 in the frame F1. In this case, there is a problem that reproduction of the data D1 becomes impossible because the data D1 is not recorded in any frame other than the frame F1.

SUMMARY OF THE INVENTION

An object of the present invention is to provide a data recording/reproducing apparatus which can solve the above-mentioned problem and record and/or reproduce data with high reliability.

The invention provides a data recording/reproducing apparatus comprising:

recording means for recording data in each predetermined unit recording area on a recording medium, reading means for reading data immediately after being recorded, the reading means being located adjacently to the recording means, and error detecting means for detecting an error in the read data on the basis of output of the reading means.

Reliability is achieved by recording on the recording medium plural times data recorded in a predetermined number of unit recording areas following the unit recording areas in which errors were detected by the error detecting means, after the predetermined number of unit recording areas.

The invention provides a data recording/reproducing apparatus comprising:

recording means for recording data in each predetermined unit recording area on a recording medium, reading means for reading data immediately after being recorded, the reading means being located adjacently to the recording means, and an error detecting means for detecting an error in the read data on the basis of output of the reading means.

Reliability is achieved by recording, on the recording medium, data corresponding to a predetermined number of unit recording areas, including one or plural contiguous unit recording areas in which data had been recorded prior to the unit recording area in which the error was detected by the error detecting means, after the predetermined number of unit recording areas following the error-detected unit recording areas passed.

Preferably, recording on a recording medium of data corresponding to one or plural unit recording areas immediately before the most prior error-detected unit recording area and to the error-detected unit recording areas is performed, after a predetermined number of unit recording areas following the error-detected unit recording areas, in the case that an error of data in the unit recording area at the most upstream location in the recording direction is so bad that the data in this unit recording area cannot be restored.

Preferably, recording on a recording medium of data corresponding to the error-detected unit recording areas including the most upstream unit recording area in the recording direction is performed, after a predetermined number of unit recording areas following the error-detected unit recording areas, in the case that an error in the unit recording area at the most upstream location in the recording direction is so insignificant that the data in this unit recording area may be restored.

More preferably, recording/reproducing data is performed by means of a helical scan method.

According to the invention, data is recorded in each predetermined unit recording area on a recording medium by a recording means, and the recorded data is read by a reading means immediately after being recorded by the recording means. An error detecting means detects an error in the read data on the basis of output of the reading means. When an error is detected by the error detecting means, data recorded in a predetermined number of unit recording areas of and after the unit recording area in which the error was detected are recorded on the recording medium plural times after the predetermined number of unit recording areas.

Since the data recording/reproducing apparatus is provided with a recording means and a reading means separately, it can conduct a read operation immediately after a recording operation and detect an error in the recorded data at once. In the case that an error is detected in the recorded data, the data is recorded plural times on the recording medium; and therefore, in the case that the data re-recorded for the first time cannot be reproduced, reproduction of the data re-recorded the second time or later provides realibity. In this way, reliability of the data recording/reproducing apparatus can be improved remarkably.

According to the invention, data is recorded in each predetermined unit recording area on a recording medium by a recording means, and the recorded data is read by a reading means immediately after being recorded by the recording means. An error detecting means detects an error in the read data on the basis of output of the reading means. When an error is detected by the error detecting means, data recorded in a predetermined number of unit recording areas including one or plural contiguous unit recording areas recorded before the unit recording area in which the error was detected are recorded on the recording medium after a predetermined number of unit recording areas following the error-detected unit recording areas.

Since the data recording/reproducing apparatus is provided with a recording means and a reading means separately, it can conduct a read operation immediately after a recording operation and detect an error in the recorded data at once. In the case that an error is detected in the recorded data, the error-detected data and one or plural unit data recorded immediately before the error-detected data are re-recorded together on the recording medium; and therefore, in case that expansion of a defective portion on the recording medium caused by aging, repetition of a read operation, or the like makes it impossible to reproduce data in a unit recording area contiguous to the defective portion, reproduction of the re-recorded data occurs. In this way, reliability of the data recording/reproducing apparatus can be improved remarkably.

According to the invention as mentioned above, since the data recording/reproducing apparatus is provided with a recording means and a reading means separately, it can read data immediately after being recorded from a recording medium during its data recording operation; and if an error in recording data is detected during its recording operation, the data is re-recorded plural times. Therefore, in the case that the data re-recorded for the first time, for example, cannot be reproduced, reproduction of the data re-recorded for the second time or later will do; and as a result, a data recording/reproducing apparatus of high reliability can be implemented.

According to the invention as mentioned above, since the data recording/reproducing apparatus is provided with a recording means and a reading means separately, it can read data immediately after being recorded from a recording medium during its data recording operation; and if an error in recording data is detected during its recording operation, the error-detected data and one or plural unit data recorded immediately before the error-detected data are re-recorded together on the recording medium.

For example, therefore, in such a case that expansion of a defective portion on the recording medium caused by aging, repetition of a read operation, or the like makes it impossible to reproduce data in a unit recording area contiguous to the defective portion, reproduction of the re-recorded data will do. In this way, highly reliable recording/reproducing of data can be performed.

According to the invention, in the case that an error of data in a unit recording area in which the error was detected cannot be corrected, data corresponding to one or plural unit recording areas recorded immediately before the error-detected unit recording area and to the error-detected unit recording areas are recorded on the recording medium after a predetermined number of unit recording areas following the error-detected unit recording areas.

According to the invention, in the case that an error of data in a unit recording area in which the error was detected can be corrected, data corresponding to the error-detected unit recording areas including this error-detected unit recording area are recorded on the recording medium after a predetermined number of unit recording areas following the error-detected unit recording areas.

According to the invention, recording and/or reproducing of data is performed by a helical scan method.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other and further objects, features, and advantages of the invention will be more explicit from the following detailed description taken with reference to the drawings which are given by way of illustration only and thus are not limitative of the present invention, and wherein:

FIGS. 1(1) and 1(2) are diagrams showing recording patterns of a magnetic tape 21 on which data are recorded by a conventional R-DAT method;

FIGS. 3(1) and 3(2) are diagrams showing examples of recording patterns of a magnetic tape 14 on which data was recorded by the R-DAT1 apparatus;

DETAILED DESCRIPTION OF THE PREFERRED EMBODIMENTS

Now referring to the drawing, preferred embodiments of the invention are described below.

Figure 2:
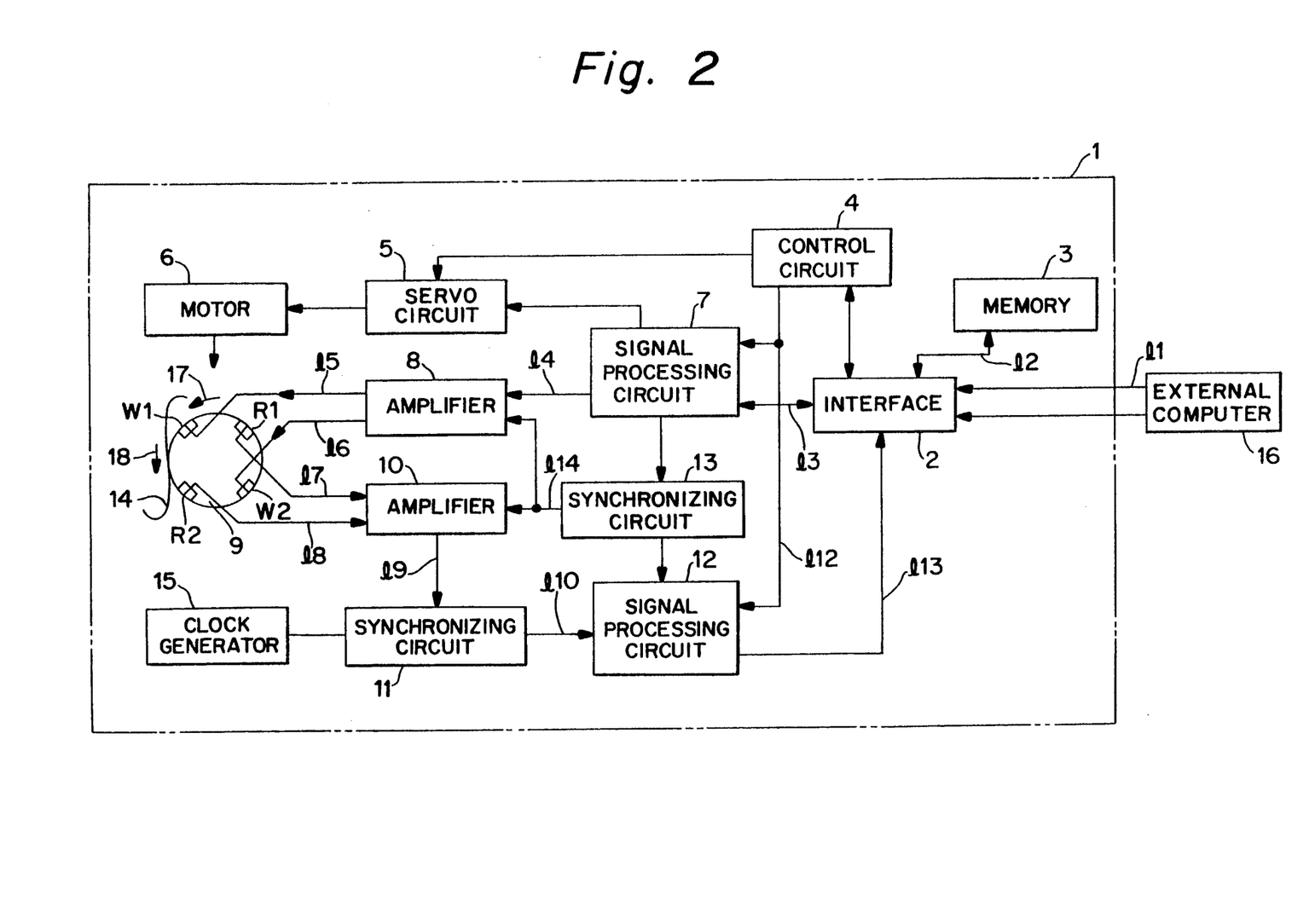
FIG. 2 is a block diagram showing a basic configuration of an embodiment of an R-DAT1 apparatus of the present invention.

FIG. 2 is a block diagram showing a configuration of an embodiment of the present invention. The embodiment uses a rotary head type digital audio tape recorder (R-DAT) 1 as an auxiliary storage of an external computer 16.

In the case of recording data from an external computer 16 on a magnetic tape 14, the data from the external computer 16 is supplied to an interface 2 through line λ1. The data through the line (1 consists of image information, voice information, processing information of the external computer 16, or the like, and is output for each information unit to two tracks of the magnetic tape 14 as described later (hereinafter this information unit is referred to as a frame). A frame contains 5120 bytes for example, and is output one by one after data is divided into each frame by the external computer 16.

Such data as this is output to a signal processing circuit 7 through a line f3 at the same time when the data is output to a memory 3 of random access memory or the like through a line (2 from the interface 2. Input and/or output operations or the like of the interface 2 are performed according to control signals from a control circuit 4 implemented by a microcomputer or the like.

A parity code, frame number, and the like are added to the data supplied to the signal processing circuit 7 from the interface 2 through the line λ3. The data to which a parity code and the like were added is supplied to an amplifier 8 through a line λ4. Data signals amplified by the amplifier 8 are supplied to a recording head W1 through a line λ5 or to a recording head W2 through a line λ6 and are switched over between them by a signal synchronized with rotation of a rotary cylinder 9 from a synchronizing circuit 13, and are recorded on the magnetic tape 14.

Figure 3:
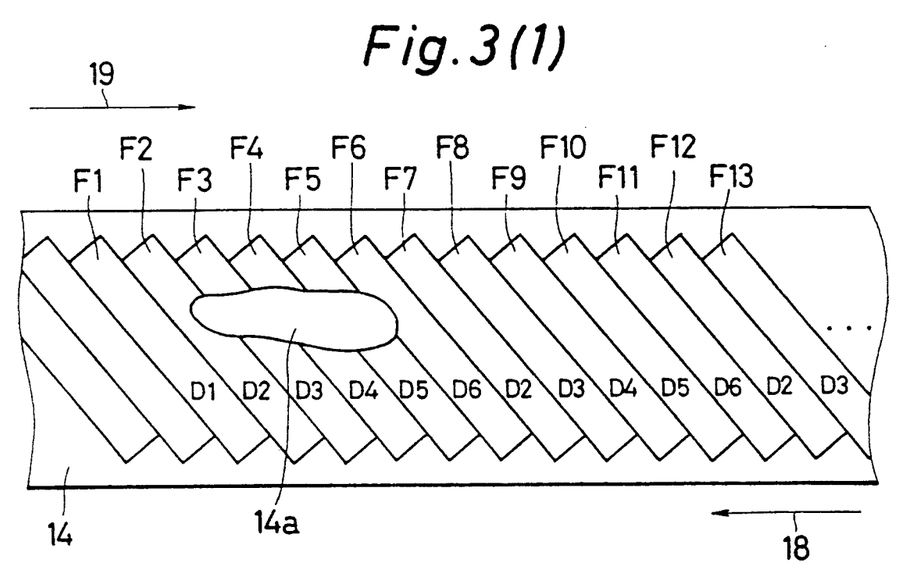

Such recording heads W1 and W2, and reproducing heads R1 and R2 as described later, are fixed on the rotary cylindrical 9 of circular cylinder type. The rotary cylinder 9 is rotated by a motor 6 around its axis in the direction indicated by an arrow 17. At this time, a servo circuit 5 controls a rotation speed of the motor 6, using a control signal from the control circuit 4. The magnetic tape 14 is run by a capstan motor (not shown in the figure) or the like in the direction indicated by an arrow 18. The magnetic tape 14 is in contact with the side face of the rotary cylinder 9 over a range of 90°, for example, of its circular cylindrical face. The recording heads W1 and W2 trace the magnetic tape 14 in a slant direction as shown in FIG. 3 and form frames Fi (i=1,2,...), respectively. A frame number which is a serial number is recorded for each frame as its identification information. The same frame number is recorded when recording the same data. The data are recorded in the recording direction indicated by an arrow 19.

Data recorded on the magnetic tape 14 is read by the reproducing head R1 or R2 individually corresponding to the recording head W1 or W2, and are switched over between them by a synchronizing signal from the synchronizing circuit 13 in the same way as the above-mentioned write operation. Signals from the reproducing heads R1 and R2 are supplied to an amplifier 10 through a line λ7 and line λ8 respectively. At this time the reproducing heads R1 and R2 respectively reproduce data in frames formed by the recording heads W1 and W2 individually corresponding to the reproducing heads R1 and R2.

A data signal amplified by an amplifier 10 is supplied to a synchronizing circuit 11 through a line λ9, and in the synchronizing circuit 11 the data signal is synchronized with a clock signal from a clock generating circuit 15. Output from the synchronizing circuit 11 is supplied to a signal processing circuit 12 through a line λ10, and in this signal processing circuit 12 an error correction for the output signal is made through the use of a parity code added in the signal processing circuit 7. Such an signal processing as an error correction and the like at this time is performed synchronously with such signal processing as parity code addition and the like.

Data which is output from the signal processing circuit 12 is supplied to the interface 2 through a line λ13. Usually the interface 2 stores the data in the memory 3 through the line λ2, and then reads the data from the memory 3 to output to the external computer 16.

Figure 4:
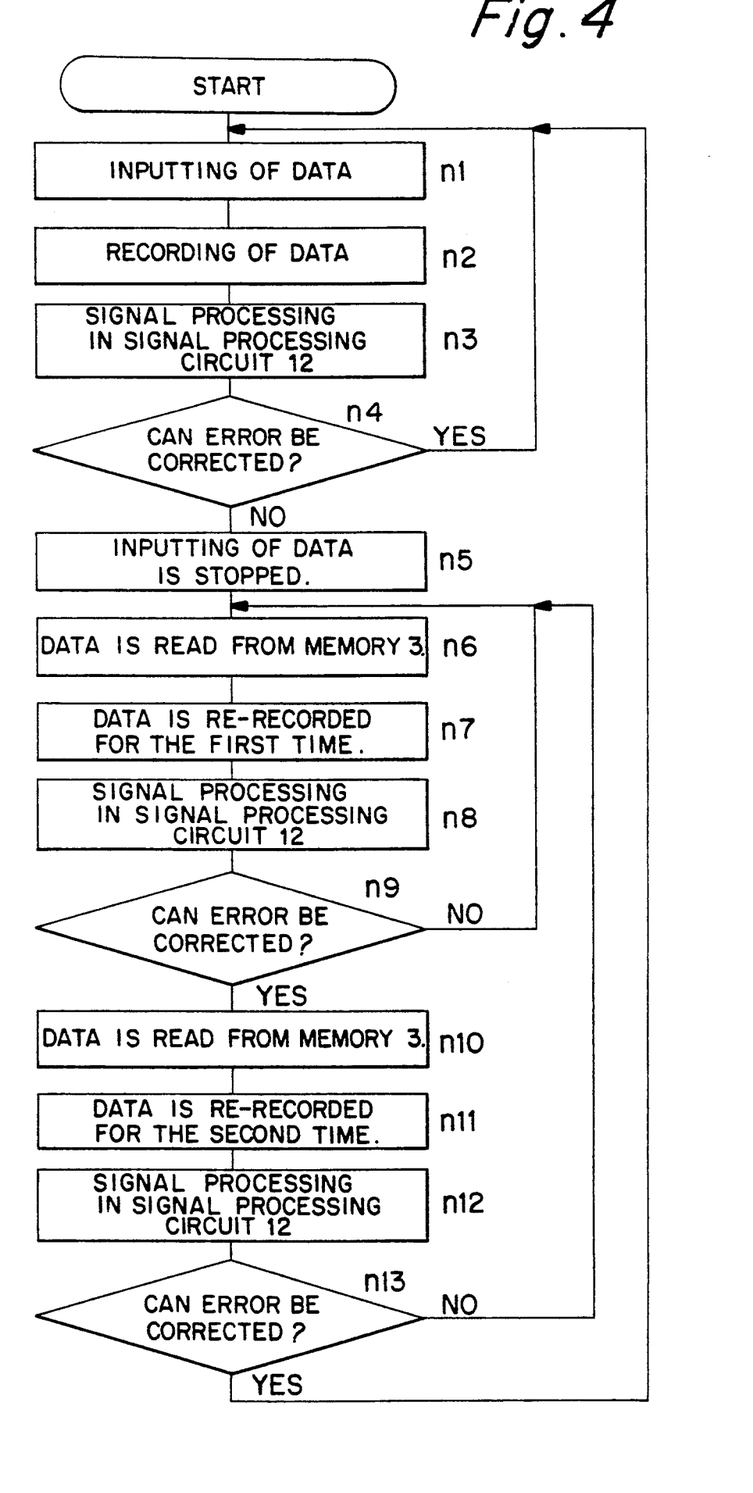
FIG. 4 is a flowchart illustrating a recording operation of the R-DAT1 apparatus.

FIG. 4 is a flowchart illustrating a recording operation of the R-DAT1. In this embodiment, it is assumed that an error has occurred at the time of recording data D2 in a frame F2 on the magnetic tape 14 shown in FIG. 3 (1). At step n1, data Di (i=1,2,...) from the external computer 16 are supplied to the signal processing circuit 7 as well as stored in the memory 3. At step n2, the data D2 to which a parity code and the like were added in the signal processing circuit 7 is recorded on the magnetic tape 14. At step n3, the data D2 reproduced by the reproducing head R1 or R2 is supplied to the signal processing circuit 12, in which signal processing is performed including an error correction of the data through the use of a parity code added in the signal processing circuit 7. At step n4, it is decided whether or not an error in the data D2 can be corrected. In case that the error in the data D2 can be corrected, namely, in case that the data D2 is normally recorded, the recording operation returns to step 1 and the next data is entered.

In case that an error in the data D2 cannot be corrected, namely, in case that it is decided that the error in the data D2 in the frame F2 cannot be corrected due to such a defective portion 14a as a flaw or the like on the magnetic tape 14 as shown in FIG. 3 (1), the recording operation proceeds to step n5 and data entering from the external computer 16 is stopped. At this time, data D2 to at least data D6 have been stored in the memory 3 and data D1 to D6 have been recorded on the magnetic tape 14.

At step n6, the data D2 in which an error could not be corrected is read from the memory 3, and at step n7 the first re-recording of the data D2 is performed. At step n8, the signal processing circuit 12 performs a signal processing including an error correction of the data D2 by a parity check. During this period of time, data D3 to D6 are sequentially read from the memory 3 and are recorded in frames F8 to F11 respectively. At step n9, it is decided whether or not an error in the re-recorded data D2 can be corrected. In the case that the error correction is impossible, the recording operation returns to step n6, while it proceeds to step n10 in the case that the error correction is possible.

At step n10, the data D2 is read again from the memory 3, and at step n11 the second re-recording of the data D2 is performed. At step n12, the signal processing circuit 12 performs a signal processing including an error correction of the re-recorded data D2. For this period of time, data D3 to D6 are sequentially read from the memory 3 and sequentially recorded on the magnetic tape 14. At step n13, it is decided whether or not an error in the data D2 can be corrected. In the case that the error correction is impossible, the recording operation returns to step n6 and starts again with the first re-recording of the data D2. In the case that the error correction is possible, the recording operation returns to step n1 so that the next data is entered from the external computer 16. In other words, in the case that an error in the first recorded data cannot be corrected by its parity code, a re-recording operation is repeated until two consecutive recording operations are normally performed.

According to this embodiment, as mentioned above, in the case that a data error caused by a defective portion 14a of a magnetic tape 14 has been detected during recording when using an R-DAT1 as an auxiliary storage of an external computer 16, the data is re-recorded twice. The data re-recorded the second time is therefore re-recorded at a distance long enough from the defective portion 14a. When reproducing the second re-recorded data, therefore, any disorder does not occur in tracking control during reproduction as described in relation to the prior art; and as a result, highly reliable recording/reproducing of data can be performed.

In this embodiment the re-recording is performed twice, but it also may be performed three or more times.

In the case of reproducing data recorded on a magnetic tape 14 in this way, for example, reproduced data in each frame is temporarily stored in a memory 3 and when it is output, a frame number of the data to be output and a frame number of the fifth data thereafter the data to be output are compared with each other. If these two frame numbers are equal to each other, data corresponding to the first output data is not output.

In this embodiment of the present invention, description is given of an R-DAT, but the invention does not have to be restricted to an R-DAT. The invention can be embodied also in such storage apparatus as a cassette tape recorder, video tape recorder and the like, for example.

Figure 5:
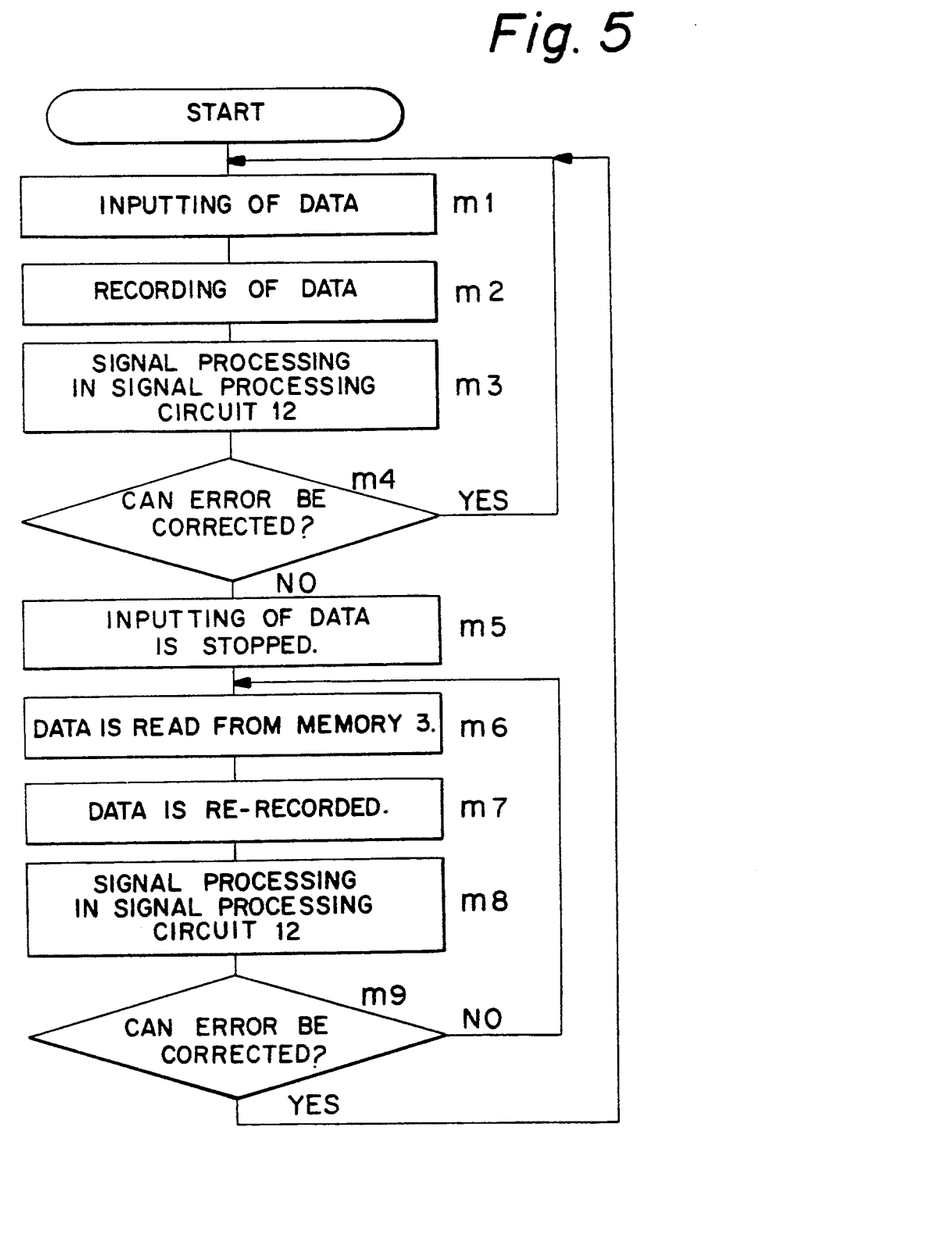
FIG. 5 is a flowchart illustrating another recording operation of the R-DAT1 apparatus.

FIG. 5 is a flowchart illustrating another recording operation of the R-DAT1. In this embodiment, it is assumed that an error has occurred at the time of recording data D2 in a frame F2 on the magnetic tape 14 shown in FIG. 3 (2). At step m1, data Di (i=1,2,...) from the external computer 16 are supplied to the signal processing circuit 7 as well as stored in the memory 3. At step m2, the data D2 to which a parity code and the like were added in the signal processing circuit 7 is recorded on the magnetic tape 14. At step m3, the data D2 reproduced by the reproducing head R1 or R2 is supplied to the signal processing circuit 12, in which signal processing is performed including an error correction of the data using a parity code added in the signal processing circuit 7. At step m4, it is decided whether or not an error in the data D2 can be corrected. In the case that the error in the data D2 can be corrected, namely, in the case that the data is normally recorded, the recording operation returns to step m1 and the next data is entered.

In the case that an error in the data D2 cannot be corrected, namely, in case that it is decided that the error in the data D2 in the frame F2 cannot be corrected due to such a defective portion 14a as a flaw or the like on the magnetic tape 14 as shown in FIG. 3 (2), the recording operation proceeds to step m5 and data entering from the external computer 16 is stopped. During this time, data D1 to at least data D6 have been stored in the memory 3 and the data D1 to D6 have been recorded on the magnetic tape 14.

At step m6, the data D1 recorded before the data D2 in which an error could not be corrected is read from the memory 3, and at step m7 the data D1 is re-recorded. At step m8, the signal processing circuit 12 performs a signal processing including an error correction of the data D1 by a parity check. For this period of time, data D2 to D5 are sequentially read from the memory 3 and are recorded in frames F8 to F11 respectively. At step m9, it is decided whether or not an error in the re-recorded data D1 can be corrected. In the case that the error correction is impossible, the recording operation returns to step m6 and the data D1 is re-recorded again. In the case that the error correction is possible, the recording operation returns to step m1 so that the next data is entered from the external computer 16. As mentioned above, when an error in recorded data cannot be corrected, the data corresponding to the error and the data recorded immediately before the data containing the error are re-recorded.

According to this embodiment, as mentioned above, in the case that an error in data D2 caused by a defective portion 14a of a magnetic tape 14 has been detected during recording when using an B-DAT1 as an auxiliary storage of an external computer 16, data D1 which was recorded immediately before the data D2 is also re-recorded.

Therefore, in the case that expansion of a defective portion 14a caused by aging or repetition of a reproducing operation makes it impossible to reproduce the data D1 in the frame F1, reproduction of the data D1 in the frame F7 provides reliable recorded data. In this way, highly reliable recording/reproducing of data can be performed.

In this embodiment of the present invention, the re-recording begins with the data D1, but it may also begin with some data recorded before the data D1.

In the case of reproducing data recorded on a magnetic tape 14 in this way, reproduced data in each frame is temporarily stored in a memory 3 and when it is output, a frame number of the data to be output and a frame number of the fifth data thereafter are compared with each other; and if these two frame numbers are equal to each other, the data corresponding to the first output data is not output.

Since a tracking control for reproducing data on the magnetic tape 14 is performed on the basis of reproducing signals, some disorder occurs in a tracking control when reproducing data in frames F2 to F5 holding a defective portion 14a on them.

Since it takes a certain period of time for the tracking control to recover from this disorder, data in frames to be reproduced for this period of time may not be reproduced correctly. Namely, since the data D1 or the like recorded in a frame F7 on the magnetic tape 14 may not be reproduced correctly, re-recording of the data may be performed plural times.

In the embodiment of the present invention, description is given on an R-DAT, but the invention does not have to be restricted to an R-DAT. The invention can be embodied also in such storage apparatus as a cassette tape recorder, video cassette tape recorder or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A data recording/reproducing apparatus for preventing loss of data due to enlargement of defects of a recording medium comprising:
    recording means for recording data in frames on the recording medium;
    reading means for reading the data immediately after it is recorded, said reading means being located adjacently to said recording means; and
    error detecting means for detecting frames in which the read data contains error, on the basis of output of said reading means,
    said recording means recording the data of the frames in which error has been detected by said error detecting means, and the data of an immediately preceding frame which is error free, on the recording medium plural times in frames which are a predetermined number of frames after the frames in which error has been detected, to prevent loss of data due to enlargement of a defect in the recording medium of the frames in which error has been detected.

2. A data recording/reproducing apparatus comprising:
    recording means for recording data in frames on a recording medium;
    reading means for reading data immediately after it is recorded, said reading means being located adjacently to said recording means; and
    error detecting means for detecting frames in which the read data contains error, on the basis of output of said reading means,
    said recording means recording, on the recording medium, the data of the unit frames in which error has been detected by said error detecting means, and one or plural contiguous frames preceding the frames in which error has been detected, in frames which are a predetermined number of frames after the frames in which error has been detected, to prevent loss of data due to enlargement of a defect in said recording medium of the frames in which the error has been detected.

3. The data recording/reproducing apparatus as claimed in claim 1 or 2, wherein said recording means records the data by a helical scan method.

4. A method of recording data on a recording medium having plural frames, using a recording/reproducing apparatus including adjacent recording means and reading means, comprising the steps of:
    storing the data to be recorded sequentially in memory means under direction of control means;
    recording the stored data in sequential order in consecutive frames of the recording medium using the recording means;
    reading the recorded data of the frames with the reading means immediately after it is recorded;
    determining in error detecting means the frames in which the read data contains error; and
    re-recording the stored data corresponding to the frames in which error has been detected, during said determining step, and the stored data corresponding to a frame immediately preceding the frames in which error has been detected to record error-free data and to prevent loss of the data due to enlargement of defects in the recording medium,
    said recording continuing sequentially in the event that error has not been detected during said determining step.

5. The method of recording data in claim 4, wherein said step of re-recording comprises re-recording the stored data corresponding to the frames in which error has been detected and the immediately preceding frame plural times.

6. The method of recording data of claim 5, wherein said step of re-recording comprises re-recording the stored data corresponding to the frames in which error has been detected and the immediately preceding frame in frames which are a predetermined number of frames after the frames in which error has been detected.

7. The method of recording data of claim 4, further comprising stopping said step of storing the data sequentially in the event that error has been detected.

8. The method of recording data of claim 4, said step of re-recording further comprising re-recording the stored data corresponding to plural frames which precede the immediately preceding frame.

9. A data recording/reproducing apparatus comprising:
    memory means for sequentially storing data to be recorded on a recording medium in plural frames;
    recording means for sequentially recording the data on the recording medium in consecutive frames;
    interface means for receiving input data to be recorded and for simultaneously supplying the data to said memory means and said recording means;
    reading means, disposed adjacently to said recording means, for reading the recorded data from the recording medium immediately after it is recorded; and
    error detecting means, coupled to said reading means, said recording means and said interface means, for comparing the recorded data of the frames to corresponding stored data to determine the frames in which the recorded data contains error,
    said recording means re-recording the stored data corresponding to the frames in which error has been detected by said error detecting means, and the stored data corresponding to an immediately preceding frame which is error-free, on the recording medium in frames which are a predetermined number of frames after the frames in which error has been detected, to prevent loss of data due to enlargement of a defect in the recording medium corresponding to the frames in which error has been detected.

10. The data recording/reproducing apparatus of claim 9, wherein said recording means re-records the stored data plural times.

11. The data recording/reproducing apparatus of claim 9, wherein said interface means stops the supply of the data to said memory means and said recording means if said error detecting means determines that the recorded data has been recorded with error.

12. The data recording/reproducing apparatus of claim 9, wherein said interface means continues to supply the data to said memory means and said recording means if said error detecting means determines that the recorded data has been recorded without error.

13. A data recording/reproducing apparatus comprising:

recording means for recording data in frames on a recording medium; and reading means for reading the data immediately after it is recorded, said reading means being located adjacently to said recording means; and error detecting means for detecting frames in which the read data contains error, on the basis of output of said reading means, said recording means recording the data of the frames in which error has been detected by said error detecting means and an immediately preceding error-free frame, on said recording medium plural times in frames which are located a predetermined distance from the frames in which error has been detected, the predetermined distance being a distance which allows tracking control recovery from tracking disorder which occurs as a result of the detected error.

14. The data recording/reproducing apparatus of claim 13, wherein said recording means records the data by a helical scan method.

15. A data recording/reproducing apparatus comprising:

memory means for sequentially storing data to be recorded on a recording medium which has plural frames;

recording means for sequentially recording the data on the recording medium in consecutive frames;

interface means for receiving input data to be recorded and for simultaneously supplying the data to said memory means;

reading means disposed adjacently to said recording means, for reading the recorded data from the recording medium immediately after it is recorded; and error detecting means, coupled to said reading means, said recording means and said interface means, for comparing the recorded data of the frames to corresponding stored data to determine frames in which the recorded data contains error, said recording means re-recording the stored data corresponding to the frames in which error has been detected by said error detecting means and an immediately preceding error-free frame in frames which are located a predetermined distance from the frames in which error has been detected, the predetermined distance being a distance which allows tracking control recovery from tracking disorder which occurs as a result of the detected error.

16. The data recording/reproducing apparatus of claim 15, wherein said recording means records the data by a helical scan method.

* * * * *